United States Patent
Johnson et al.

(10) Patent No.: US 11,868,482 B2
(45) Date of Patent: Jan. 9, 2024

(54) VULNERABILITY TRACING USING SCOPE AND OFFSET

(71) Applicant: GitLab Inc., San Francisco, CA (US)

(72) Inventors: James Johnson, Sammamish, WA (US); Julian Thome, Esch-sur-Alzette (LU); Lucas Charles, Portland, OR (US)

(73) Assignee: GitLab Inc., San Francisco, CA (US)

( * ) Notice: Subject to any disclaimer, the term of this patent is extended or adjusted under 35 U.S.C. 154(b) by 71 days.

(21) Appl. No.: 17/941,935

(22) Filed: Sep. 9, 2022

(65) Prior Publication Data

US 2023/0104814 A1    Apr. 6, 2023

Related U.S. Application Data (60) Provisional application No. 63/247,019, filed on Sep. 22, 2021.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,792,443 | B1 * | 10/2017 | Sheridan .............. G06F 21/563 |
| 11,061,652 | B1 | 7/2021 | Biswas et al. |
| 2011/0197177 | A1 * | 8/2011 | Mony ..................... G06F 8/51 |
| | | | 717/115 |
| 2018/0034846 | A1 * | 2/2018 | Marquez ............. H04L 63/1433 |
| 2019/0147167 | A1 | 5/2019 | Kim et al. |
| 2021/0034757 | A1 | 2/2021 | Boulton et al. |
| 2021/0279338 | A1 | 9/2021 | Bowman et al. |

OTHER PUBLICATIONS

PCT International Search Report and Written Opinion, PCT Application No. PCT/US2022/043858, dated Jan. 6, 2023, 10 pages.

* cited by examiner

*Primary Examiner* — Fatoumata Traore
(74) *Attorney, Agent, or Firm* — Fenwick & West LLP (57) ABSTRACT

Source code is managed through a source code management system and one or more static application security testing scanners check the source-code for vulnerabilities. The scanners generate vulnerability reports that are processed by a vulnerability tracker. The vulnerability tracker computes the scopes of identified vulnerabilities from the source-code and generates scope and offset fingerprints (e.g., hashes that uniquely identify vulnerabilities based on their surrounding scope). The fingerprints used for deduplication and vulnerability tracking. The vulnerability tracker may generate a refined vulnerability report that includes a set of deduplicated vulnerabilities with the corresponding fingerprints. The refined vulnerability report and related data may be stored in a vulnerability database for use in vulnerability management.

18 Claims, 4 Drawing Sheets

VULNERABILITY TRACING USING SCOPE AND OFFSET

CROSS REFERENCE TO RELATED APPLICATIONS

This application claims the benefit of U.S. Provisional Application No. 63/247,019, filed Sep. 22, 2021, which is incorporated by reference.

BACKGROUND

1. Technical Field

The subject matter described relates generally to detecting software vulnerabilities and, in particular, to an approach to tracking vulnerabilities that reduces double reporting using scope and offset fingerprints of detected vulnerabilities.

2. Background Information

Many entities manage software projects using Source Code Management (SCM) systems (such as Git). As code is written and modified, security vulnerabilities inevitably arise. A security vulnerability is a software defect that enables attackers to gain control of a system or otherwise cause a system to behave in an unintended or undesirable way. Consequently, entities often apply automated security testing processes that monitor the changing code to detect security vulnerabilities as early as possible in the software development process.

One example of automated security testing processes are static application security testing (SAST) tools that can automatically detect vulnerabilities in the source code of a software project. SAST tools are typically language and problem specific. For example, some SAST tools can detect secrets (e.g., hardcoded passwords) in the source code, while other tools are focused on detecting potentially insecure flows, etc. Thus, entities may employ multiple SAST tools in combination to reduce the overall attack surface of the software.

Each SAST tool analyzes the source code and reports detected vulnerabilities for further analysis (e.g., by a human security analyst). In many cases, the same vulnerability may be reported multiple times because it appears more than once in the source code, is detected by more than one of the SAST tools, or both. Consequently, the security analyst must spend a significant amount of time sifting through potential duplicates to verify they are the same. Furthermore, as the code is modified, the same vulnerability may be moved to a new location in the source code or the source code may be reformatted without substantive changes, making it difficult for the security analyst to determine whether any given reported vulnerability is new or a duplicate of one seen previously.

SUMMARY

The above and other problems may be addressed by a vulnerability tracking process that can automatically identify and track duplicate vulnerabilities. In particular, the disclosed process identifies vulnerabilities based on a scope and offset fingerprint that includes information about the code surrounding an identified vulnerability. This may reduce the amount of noise considered by a security analyst by reducing instances of double reporting and tracking identified vulnerabilities that are moved to different positions in the code during the development cycle.

In one embodiment, a method for identifying and deduplicating vulnerabilities in a software project includes receiving source code and generating a parse tree from the source code. The scopes of source code blocks are extracted using the parse tree. The method also includes receiving vulnerability reports relating to the source code from one or more code scanners. The vulnerability reports identify vulnerabilities in the source code. The vulnerabilities identified in the vulnerability reports are matched to corresponding scopes and fingerprints are generated from at least some of the scoped vulnerabilities. The method further includes deduplicating the scoped vulnerabilities using the fingerprints and generating a refined vulnerabilities report using the deduplicated scoped vulnerabilities.

DETAILED DESCRIPTION

The FIGURES and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
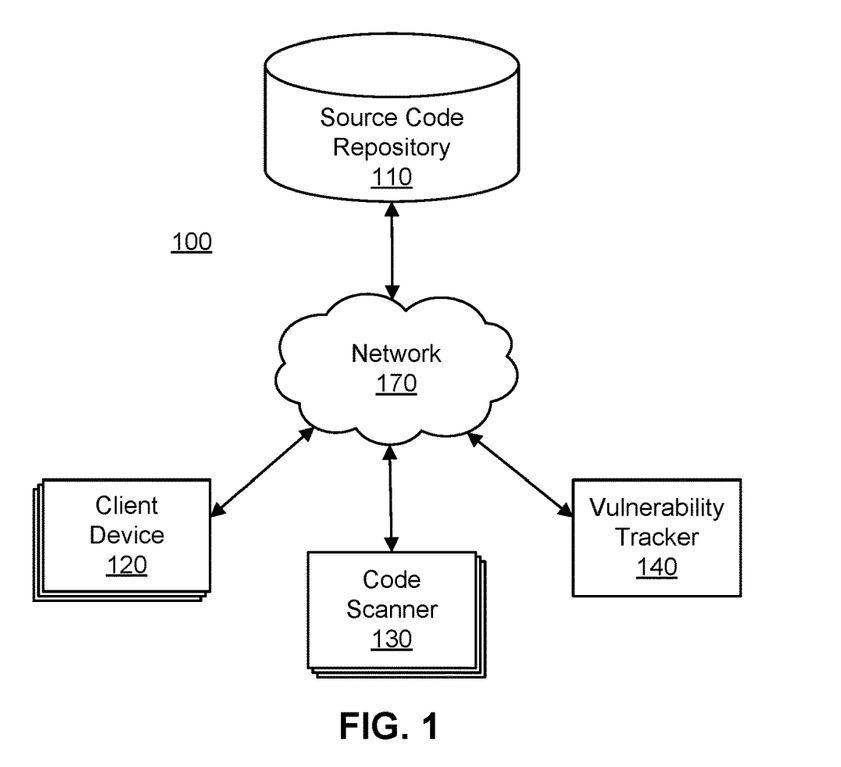
FIG. 1 is a block diagram of a networked computing environment suitable for managing the code of a software project, according to one embodiment.

FIG. 1 illustrates one embodiment of a networked computing environment 100 suitable for managing the code of a software project. In the embodiment shown, the networked computing environment includes a source code repository 110, one or more client devices 120, one or more code scanners 130, and a vulnerability tracker 140, all connected via a network 170. In other embodiments, the networked computing environment 100 includes different or additional elements. In addition, the functions may be distributed among the elements in a different manner than described. For example, although the code scanners 130 and vulnerability tracker 140 are shown as distinct entities, in some embodiments the corresponding functionality is provided by a single computing system (e.g., a server).

The source code repository 110 includes one or more computer-readable storage media that store the code for one or more software projects. In one embodiment, the source code repository 110 stores the code for a SCM system. The SCM system may store multiple versions of the code for the software project to enable updates to be rolled back and developers to review the historical status of the code, etc.

The client devices 120 are computing devices with which software engineers may edit code and commit updates to the code repository 110. For example, a client device 120 may be a desktop workstation with which an engineer downloads a portion of code from the source code repository 110, makes and tests revisions in a development environment, and uploads the revised code to the source code repository 110. Multiple engineers may each use a corresponding client device 120 to revise code and commit those revisions to the source code repository 110 at any given time. Known suitable techniques may be used to manage conflicts between updates made to the code by different engineers at approximately the same time.

The code scanners 130 continuously, periodically (e.g., hourly, daily, etc.), or on demand scan the code in the source code repository to identify vulnerabilities. In one embodiment, the code scanners 130 include a set of SAST tools. Each SAST tool scans the code (or portions of the code in a language the SAST is intended to be used with) in to identify vulnerabilities. The SAST tools generate vulnerability reports with information regarding identified vulnerabilities. A SAST tool may generate a report including all of the vulnerabilities identified after scanning the code (or a specified portion of the code). Alternatively, the SAST tool may generate an individual report about each identified vulnerability (e.g., immediately after identifying it).

The vulnerability tracker 140 ingests the reports generated by the code scanners and processes them to remove duplicates where the same vulnerability was identified more than once. In one embodiment, the vulnerability tracker 140 identifies duplicates by generating fingerprints from the scope and offset of vulnerabilities.

A scope is a (possibly nested) source code block that may contain statements and expressions including definitions/declarations of entities such as variables, functions, classes, structs, types. etc. Scopes limit the visibility of these entities to a part of the program. In one embodiment, a scope tag uniquely identifies a scope which is composed of scope elements where a scope element refers to a concept, such as a package, module, namespace, type, class, function definition, etc., which are relevant with respect to scoping. The scope tag is labeled with its corresponding source-code token.

For example, consider the following code snippet:

```
module Widget
    class CustomWidget
        def run(user_supplied_arg)
            exec("echo #{user_supplied_arg}")
        end
    end
end
```

The code snippet includes four scopes/scope tags: (1) custom_widget.rb; (2) custom_widget.rb>Widget; (3) custom_widget.rb>Widget>CustomWidget; and (4) custom_widget.rb>Widget>CustomWidget>run. Note this treats the file containing the source code as a separate scope. The '>' symbol is used herein as a delimiter that separates scope elements. However, any preferred delimiter may be used.

An offset indicates the position of a specific piece of code (e.g., a line identified as a vulnerability) within a scope. In one embodiment, the offset is stated as a number that indicates the number of lines of code from the start of a scope to the specific piece of code being identified.

Various embodiments of processes for identifying duplicate vulnerabilities in code using fingerprints are described in greater detail below, with reference to FIG. 2.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Figure 2:
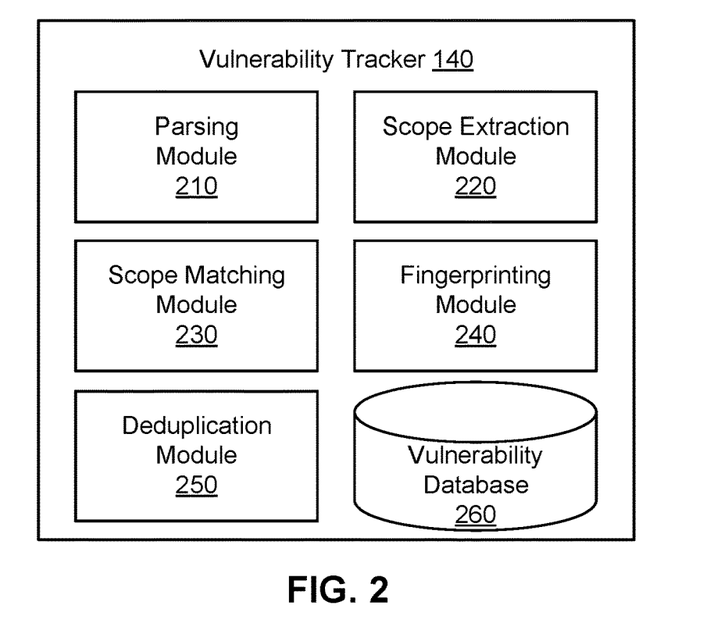
FIG. 2 is a block diagram of the vulnerability tracker shown in FIG. 1, according to one embodiment.

FIG. 2 illustrates one embodiment of the vulnerability tracker 140. In the embodiment shown, the vulnerability tracker 140 includes a parsing module 210, a scope extraction module 220, a scope matching module 230, a fingerprinting module 240, a deduplication module 250, and a vulnerability database 260. In other embodiments, the networked computing environment 100 includes different or additional elements. In addition, the functions may be distributed among the elements in a different manner than described.

The parsing module 210 parses the source code to obtain a parse tree. The parse tree is a structural/hierarchical representation of the source code. For example, the parse tree can indicate libraries, classes, functions, calls, etc. along with the relationships between them. In one embodiment, the vulnerability tracking methodology is independent from any specific programming language so any parser that can produce a parse tree from source code may be used.

Parsing is the process of deriving a parse tree from source code. The following code snippet shows an example program example.rb including three classes with four functions and four calls:

```
class OuterClass
    class InnerClassA
        def function_A
            puts ". . ."
        end
        def function_A
            puts ". . ."
        end
    class InnerClassB
        def function_A
            puts ". . ."
        end
        def function_B
            puts ". . ."
        end
    end
end
```

Figure 3:
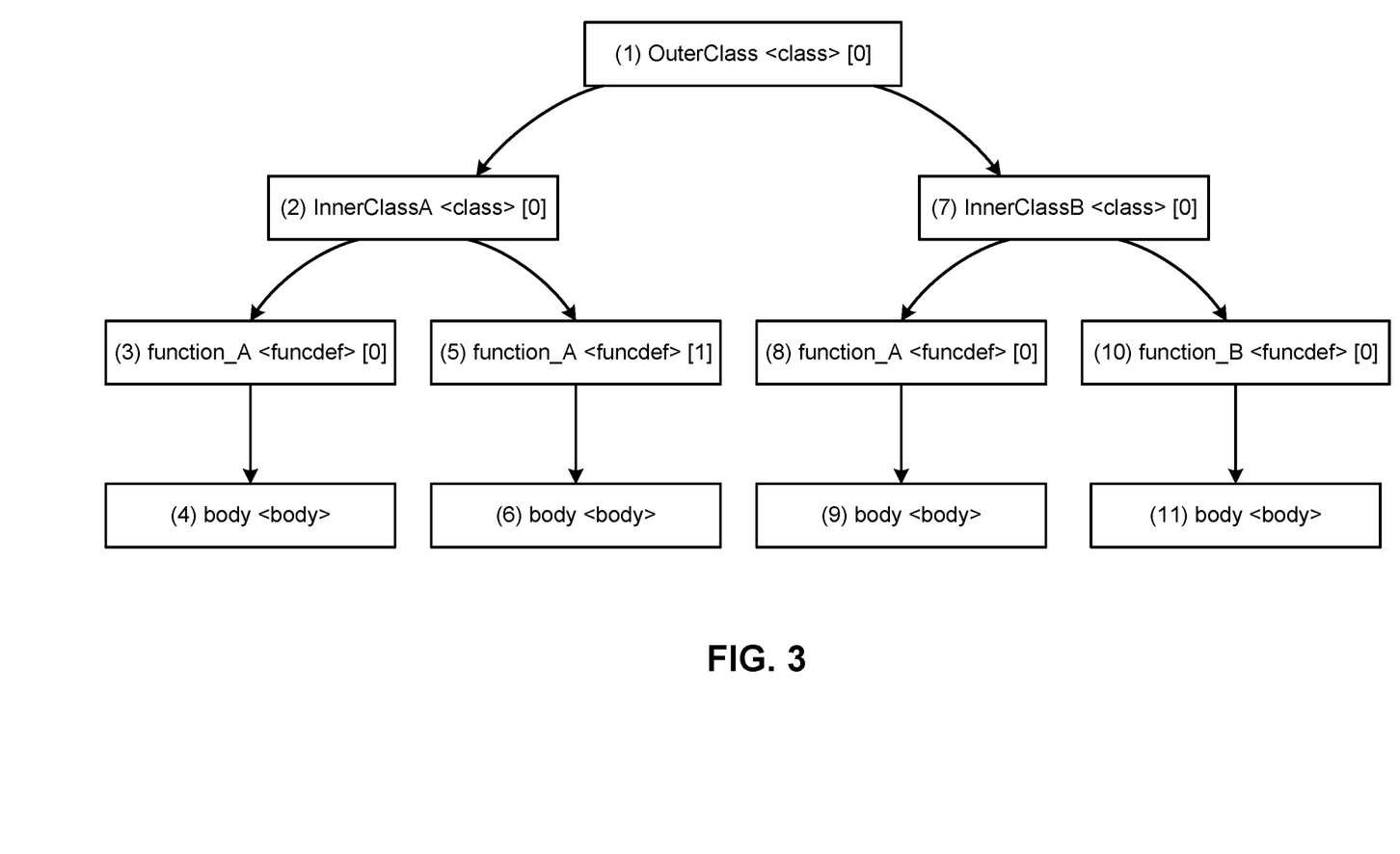
FIG. 3 illustrates an example parse tree for a segment of code, according to one embodiment.

The parser is able to understand the syntactic elements of the source code and constructs a hierarchical representation of the code which is called syntax tree or parse tree. FIG. 3 illustrates a simplistic view of a parse tree that may be produced by the parser. For simplicity, the file name parts of the scope labels are omitted in the following description. The parse-tree structure captures the scoping through parent-child node relationships: a parent node, if it represents a scope element, provides a scope to its children. Conversely, the scope of a child node cannot exist without the scope provided by its parent node. For example, the child scope OuterClass>InnerClassB>function_A cannot exist without the parent scope OuterClass>InnerClassB. FIG. 3 also indicates the node types for the nodes (enclosed in < > in the figure) that are provided by the parser. For example, the OuterClass is a node of type <class>, a node that refers to a class declaration as it appears in the source code.

Referring back to FIG. 2, the scope extraction module 220 analyzes the parse tree to identify the scopes present in the source code (source code blocks that cage the visibility of variables and/or functions that are present in the source file). In one embodiment, each node in the parse tree corresponds to a scope, and a scope is labeled by traversing the tree back to the root node (e.g., the name of the file containing the code) and adding an identifier of each node parsed through to the label.

For example, returning to the example.rb code snippet and its corresponding parse tree of FIG. 3, the scope extraction module 220 identifies seven scopes with the following labels, where A>B denotes that scope element B is nested in scope element A:
  (a) example.rb>OuterClass [0]
  (b) example.rb>OuterClass [0]>InnerClassA [0]
  (c) example.rb>OuterClass [0]>InnerClassA [0]>function_A [0]
  (d) example.rb>OuterClass [0]>InnerClassA [0]>function_A [1] (a duplicate of c)
  (e) example.rb>OuterClass [0]>InnerClassB [0] example.rb>OuterClass [0]>InnerClassB [0]>function_A [0]
  (g) example.rb>OuterClass [0]>InnerClassB [0]>function_B [0]

Notably, in InnerClassA [0], there are two function_As, the first one is node 3 with an index number [0], and the second one is node 5 with an index number [1]. The scope of node 3 (corresponding to the above item (c)) is same as the scope of node 5 (corresponding to the above item (d)). Thus, a duplicate one may be removed.

The scope computation may be done in a depth-first (DF) pre-order traversal. Pre-order traversal enables computation of the parent scope before computing the child scopes, which is an efficient order due to their interdependence. For example, the above scope (e) OuterClass [0]>InnerClassB [0] (which corresponds to the scope of node 7) is needed to compute the above scope (f) OuterClass [0]>InnerClassB [0]>function_A [0] (which corresponds to the scope of node 8). The numerals associated with each node in FIG. 3 indicate the order in which the scope extraction module 220 may visit each node in the parse tree.

In one embodiment, the scope extraction module 220 relies on a stack of tags (that are computed based on the identified scope elements), as well as a set of tags that captures all the tags that have been generated. The traversal algorithm walks down (descends) the tree irrespective of the node type. For node types that are relevant with respect to scoping, the scope extraction module 220 creates a tag and descends. Each time the scope extractor encounters a node that corresponds to a scope, a new scope tag is generated. Some node types that are irrelevant for scoping may be skipped.

In the example of example.rb, at traversal step 1, the scope extraction module 220 encounters a node of type <class> which is relevant with regards to scoping as it represents a class declaration. Hence, it generates a corresponding scope tag for OuterClass, adds the scope tag to the set of scope tags, and pushes the scope tag onto the tag stack so that it is accessible for the child nodes that the scope extraction module 220 is going to analyze next. At traversal step 3, the scope extractor encounters a <funcdef> (a function definition node). The scope extraction module 220 generates a tag by peeking the tag item that was generated last from the stack (OuterClass>InnerClassA). This information is used to generate a new tag item (OuterClass>InnerClassA>function_A). Note that once the scope extraction module 220 is done processing a node, the corresponding tag item is popped from the stack. For example, once the scope extraction module 220 is done with traversal steps 3 and 4, it pops OuterClass>InnerClassA>function_A from the stack so that, at traversal step 5, OuterClass>InnerClassA is the last tag item on the stack.

Some languages allow methods/classes to be defined multiple times. For example, in the code represented by the parse tree in FIG. 3, the function_A is defined twice within InnerClassA, which both translate to OuterClass>InnerClassA>function_A so that a concatenation of scope elements does not guarantee tag uniqueness. In one embodiment, the scope extraction module 220 applies a numbering scheme to the scope elements to enable the generation of unique tags by maintaining an internal counter that tracks how often a scope element has been encountered within a scope. In the case of FIG. 3, the counters are indicated by the numbers enclosed in brackets. Thus, due to the scope numbering scheme, instead of using the same scope tag for function_A that appears twice in InnerClassA, the scope extraction module 220 generates dedicated scope tags for both occurrences with OuterClass[0]>InnerClassA[0]>function_A[0] and OuterClass[0]>InnerClassA[0]>function_A[1].

The scope tags produced by the scope extraction module 220 may include source coordinates that capture the scope boundaries, i.e., the start and end source positions of a given scope. For example, the line numbers at which the block of code corresponding to the scope begins and ends may be used to define the scope boundaries.

The example below shows an excerpt from the sample program custom_widgets.rb:

| 1: | module Widget |
| 2: | class Custom Widget |
| 3: | def foo(arg) |
| // | ... |
| 10: | end |
| // | ... |
| 20: | def run(user_supplied_arg) |
| // | ... |
| 30: | end |
| 31: | |
| 32: | end |
| 33: | end |

The scope extraction module 220 generates a scope table that includes the scope tag as well as the scope boundary denoted by start and end lines of the scope in the source code. The example scope table below (Table 1) details the scope tags as well as the start and end-lines for the scopes that are contained in the code snippet above.

TABLE 1

Scope tags and their line number boundaries.

| Scope Tag | Start-Line | End-Line |
|---|---|---|
| custom_widget.rb[0] | 1 | 33 |
| custom_widget.rb[0] > Widget[0] | 1 | 33 |
| custom_widget.rb[0] > Widget[0] > Custom Widget[0] | 2 | 32 |
| custom_widget.rb[0] > Widget[0] > Custom Widget[0] > foo[0] | 3 | 10 |
| custom_widget.rb[0] > Widget[0] > Custom Widget[0] > run[0] | 20 | 30 |

For example, in Table 1, the scope of the function run with scope tag custom_widgets.rb[0]>Widget[0]>CustomWidget[0]>run[0] starts on line 20 and ends on line 30.

Referring again to FIG. 2, the scope matching module 230 scopes the vulnerabilities that are included in vulnerability reports received from one or more SAST scanners. A vulnerability report may identify the location of a vulnerability by a line number. The scope matching module 230 uses the scope boundaries in conjunction with the line number of the vulnerability to identify the scope that includes/wraps it.

For example, assuming that scope.start_line and scope.end_line denote the start and end lines of a scope (the scope boundaries) in the source code file, respectively, the scope matching module 230 may identify the narrowest scope that encompasses the reported vulnerability whose position is identified by its source code line (line). In one embodiment, the scope matching module identifies the narrowest scope, i.e., the scope for which the following parameter (smatch) is minimized:

smatch=((line−scope.start_line)+(scope.end_line−line)) with
scope.start_line<=line<=scope.end_line Using the running example, custom_widgets.rb, if a SAST tool reports a vulnerability on line 25 in the source code, the scope matching module 230 determines the matching scope based on the scope table generated by the scope extraction module 220. Table 2, below, is similar to Table 1 but also includes the smatch values for each scope.

TABLE 2 smatch values for a vulnerability finding on line 25.

| Scope Tag | Start-Line | End-Line | Smatch |
|---|---|---|---|
| custom_widget.rb[0] | 1 | 33 | 32 |
| custom_widget.rb[0] > Widget[0] | 1 | 33 | 32 |
| custom_widget.rb[0] > Widget[0] > Custom Widget[0] | 2 | 32 | 30 |
| custom_widget.rb[0] > Widget[0] > Custom Widget[0] > foo[0] | 3 | 10 | — |
| custom_widget.rb[0] > Widget[0] > Custom Widget[0] > run[0] | 20 | 30 | 10 |

The matching scope is custom_widget.rb[0]>Widget[0]>CustomWidget[0]>run[0], because line 25 is within the range of this scope (lines 20 to 30) and an smatch value of 10 is the lowest smatch value across all scopes. Note that custom_widget.rb[0]>Widget[0]>CustomWidget[0]>foo[0] is not considered because it does not satisfy the constraint scope.start_line<=line<=scope.end_line.

The fingerprinting module 240 generates fingerprints for identified vulnerabilities using the matching scopes. A fingerprint may also be based on a type or category of the corresponding vulnerability. The fingerprinting module 240 may generate the fingerprint for a vulnerability using one or more of the names of the scope identified by the scope matching module 230 for the vulnerability, the offset for the vulnerability, or a vulnerability classifier. The vulnerability classifier may be a category or type of the vulnerability included in the report received from the SAST. In one embodiment, the fingerprinting module 240 generates the fingerprint by calculating a hash value from one or more of the scope, offset, and vulnerability classifier. For example, the scope name, offset value, and vulnerability classifier may be concatenated into a text string (possibly with delimiters between parts) that is provided as input to a hash function. To make hashes comparable across different analyzers, CWEs, CVEs, or OWASP categories may be used.

Returning to the example of custom_widgets.rb, if a SAST tool reports a vulnerability with class/type CWE-22 on line 25, the fingerprinting module 240 may compute the following hash: custom_widget.rb[0]>Widget[0]>CustomWidget[0]>run[0]>5>CWE-22 where 5 is the relative scope offset that is computed by subtracting the line of the vulnerability finding from the start line of the scope that encloses it (line−scope.start_line) and CWE-22 is the vulnerability category.

The deduplication module 250 identifies which vulnerabilities are identical based on their fingerprints and removes duplicates to yield a set of refined vulnerabilities. This set of refined vulnerabilities can be stored (e.g., in the vulnerability database 260) as a refined report. The refined report takes up less storage due to the deduplication. It is also more efficient for a data analyst to review the report and address the identified vulnerabilities as they can spend significantly less time accounting for duplicate vulnerabilities.

In one embodiment, the deduplication of vulnerabilities is performed based on the generated hashes. If two vulnerabilities can be translated to the same fingerprints, they are considered identical. Specifically, if the hashes for two vulnerabilities match, this indicates that they: (1) are located in the same scope; (2) have the same vulnerability type or classification; and (3) have the same offset to the line number where their parent scope begins.

Returning to the running example of custom_widgets.rb, if a developer shifts the run function by +100 source code lines, the SAST tool would report the CWE 22 vulnerability with a +100 line difference on line 125. Because the fingerprint hash is generated based on scope and offset, not absolute position (e.g., line number), the deduplication module 250 can deduplicate the vulnerabilities from lines 25 and 125. For both vulnerabilities, the fingerprint hash is identical: custom_widget.rb[0]>Widget[0]>CustomWidget[0]>run[0]>5>CWE-22.

The vulnerability database 260 includes one or more computer readable media configured to store the refined vulnerability reports generated by the deduplication module 250. Although the vulnerability database 260 is shown as a single entity that is part of the vulnerability tracker 140, in one embodiment, the vulnerability database is spread across multiple devices in a distributed database that is accessed via the network 170.

Example Methods

Figure 4:
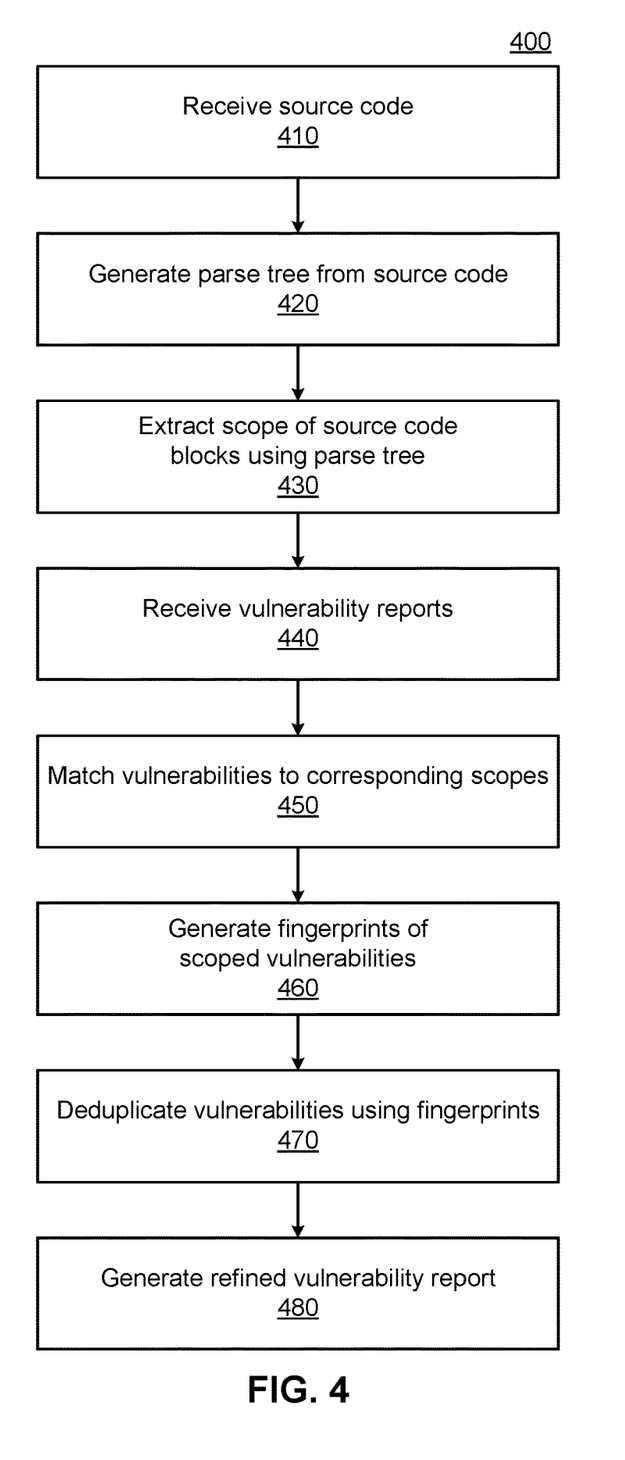
FIG. 4 is a flowchart of a method for identifying and deduplicating vulnerabilities in a software project, according to one embodiment.

FIG. 4 illustrates a method 400 for identifying and deduplicating vulnerabilities in a software project, according to one embodiment. The steps of FIG. 4 are illustrated from the perspective of the vulnerability tracker 140 performing the method 400. However, some or all of the steps may be performed by other entities or components. In addition, some embodiments may perform the steps in parallel, perform the steps in different orders, or perform different steps.

In the embodiment shown in FIG. 4, the method 400 begins with the vulnerability tracker 140 receiving 410 source code for the software project (e.g., by retrieving the source code from a source code repository 110. The vulnerability tracker 140 generates 420 a parse tree from the source code and extracts 430 the scopes of source code blocks using the parse tree. The vulnerability tracker 140 receives 440 vulnerability reports (e.g., from one or more code scanners 130) and matches 450 the identified vulnerabilities to corresponding scopes to obtain a set of scoped vulnerabilities. The vulnerability tracker 140 generates 460 fingerprints for at least some of the scoped vulnerabilities (e.g., by generating a hash from the scope name, offset, and vulnerability classifier) and deduplicates 470 the identified vulnerabilities using the hashes. The vulnerability tracker 140 generates 480 (and stores) a refined vulnerability report from the deduplicated vulnerability data.

Computing System Architecture

Figure 5:
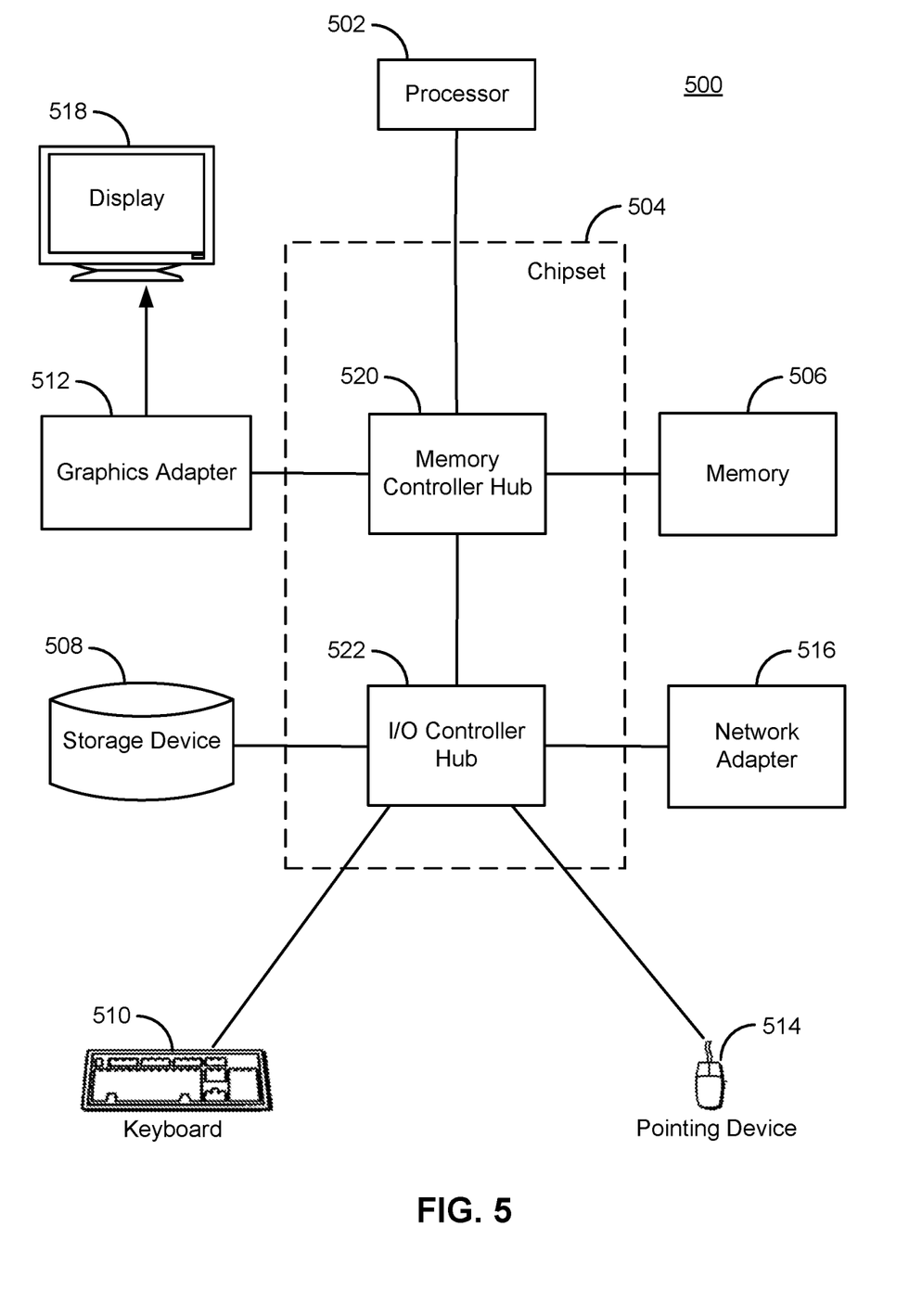
FIG. 5 is a block diagram illustrating an example computer suitable for use in the networked computing environment of FIG. 1, according to one embodiment.

FIG. 5 is a block diagram of an example computer 500 suitable for use as a client device 120, code scanner 130, or vulnerability tracker 140, or for hosting the source code repository 110. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and may be used in combination with the keyboard 510 (which may be an on-screen keyboard) to input data into the computer system 500. The graphics adapter 512 displays images and other information on the display 518. The network adapter 516 couples the computer system 500 to one or more computer networks, such as network 170.

The types of computers used by the entities of FIGS. 1 and 2 can vary depending upon the embodiment and the processing power required by the entity. For example, a system hosting the source code repository 110 might include multiple blade servers working together to provide the functionality described while a client device 120 might be a desktop workstation or tablet. Furthermore, computers 500 can lack some of the components described above, such as keyboards 510, graphics adapters 512, and displays 518.

Additional Considerations

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/-10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for tracking vulnerabilities using scope and offset values to reduce instance of duplication. Thus, while particular embodiments and applications have been illustrated and described, it is to be understood that the described subject matter is not limited to the precise construction and components disclosed. The scope of protection should be limited only by any claims that issue.

What is claimed is:

1. A method of analyzing a software project for vulnerabilities, the method comprising:
   receiving source code;
   generating a parse tree from the source code;
   extracting scopes of source code blocks using the parse tree;
   receiving, from one or more code scanners, vulnerability reports relating to the source code, the vulnerability reports identifying vulnerabilities in the source code;
   matching the vulnerabilities identified in the vulnerability reports to corresponding scopes to generate a set of scoped vulnerabilities;
   generating fingerprints of at least some of the scoped vulnerabilities, wherein the fingerprint for a vulnerability is generated using a scope of the vulnerability and an offset of the vulnerability, the offset being computed by subtracting a line number of the vulnerability from a start line of the scope;
   deduplicating the scoped vulnerabilities using the fingerprints; and generating a refined vulnerabilities report using the deduplicated scoped vulnerabilities.

2. The method of claim 1, wherein the parse tree includes a plurality of nodes, the plurality of nodes includes at least a parent node and a child node, the parent node represents a scope that provides a scope to the child node, and the child node cannot exist without the scope provided by the parent node.

3. The method of claim 2, wherein the parent node represents an outer class, and the child node represents an inner class that is nested inside the outer class.

4. The method of claim 2, wherein the parent node represents a class, and the child node represents a function that is nested inside the class.

5. The method of claim 2, wherein extracting scopes of source code blocks using the parse tree includes:
traversing the parse tree from an end child node that does not have a child to a root parent node that does not have a parent; and
labeling a scope of each node of the plurality of nodes with an identifier of the corresponding node.

6. The method of claim 2, wherein extracting scopes of source code includes performing a depth-first (DF) pre-order traversal, traversing each of the plurality of nodes of the parse tree.

7. The method of claim 1, wherein generating the fingerprint for the vulnerability comprises calculating a hash using the scope and offset.

8. The method of claim 7, wherein deduplicating the scoped vulnerabilities using the fingerprints includes:
comparing two hashes for two vulnerabilities to determine whether the two vulnerabilities are: (1) located in a same scope, (2) have a same vulnerability type or classification, and (3) have a same offset to a line number where their parent scope begins; and
responsive to determining that two hashes for two vulnerabilities match, removing one of the two vulnerabilities from the set of scope vulnerabilities.

9. The method of claim 1, wherein the fingerprint is further generated using a classifier of the vulnerability.

10. A computer program product comprising a non-transitory computer readable storage medium having instructions encoded thereon that, when executed by a processor, cause the processor to:
receive source code;
generate a parse tree from the source code;
extract scopes of source code blocks using the parse tree;
receive, from one or more code scanners, vulnerability reports relating to the source code, the vulnerability reports identifying vulnerabilities in the source code;
match the vulnerabilities identified in the vulnerability reports to corresponding scopes to generate a set of scoped vulnerabilities;
generate fingerprints of at least some of the scoped vulnerabilities, wherein the fingerprint for a vulnerability is generated using a scope of the vulnerability and an offset of the vulnerability, the offset being computed by subtracting a line number of the vulnerability from a start line of the scope;
deduplicate the scoped vulnerabilities using the fingerprints; and
generate a refined vulnerabilities report using the deduplicated scoped vulnerabilities.

11. The computer program product of claim 10, wherein the parse tree includes a plurality of nodes, the plurality of nodes includes at least a parent node and a child node, the parent node represents a scope that provides a scope to the child node, and the child node cannot exist without the scope provided by the parent node.

12. The computer program product of claim 11, wherein the parent node represents an outer class, and the child node represents an inner class that is nested inside the outer class.

13. The computer program product of claim 11, wherein the parent node represents a class, and the child node represents a function that is nested inside the class.

14. The computer program product of claim 11, wherein extracting scopes of source code blocks using the parse tree includes:
traversing the parse tree from an end child node that does not have a child to a root parent node that does not have a parent; and
labeling a scope of each node of the plurality of nodes with an identifier of the corresponding node.

15. The computer program product of claim 11, wherein extracting scopes of source code includes performing a depth-first (DF) pre-order traversal, traversing each of the plurality of nodes of the parse tree.

16. The computer program product of claim 10, wherein generating the fingerprint for the vulnerability comprises calculating a hash using the scope and offset.

17. The computer program product of claim 16, wherein deduplicating the scoped vulnerabilities using the fingerprints includes:
comparing two hashes for two vulnerabilities to determine whether the two vulnerabilities are: (1) located in a same scope, (2) have a same vulnerability type or classification, and (3) have a same offset to a line number where their parent scope begins; and
responsive to determining that two hashes for two vulnerabilities match, removing one of the two vulnerabilities from the set of scope vulnerabilities.

18. The computer program product of claim 10, wherein the fingerprint is further generated using a classifier of the vulnerability.

* * * * *

UNITED STATES PATENT AND TRADEMARK OFFICE
CERTIFICATE OF CORRECTION

Page 1 of 1

PATENT NO. : 11,868,482 B2
APPLICATION NO. : 17/941935
DATED : January 9, 2024
INVENTOR(S) : Johnson et al.

It is certified that error appears in the above-identified patent and that said Letters Patent is hereby corrected as shown below:

On the Title Page

Title item (54) and in the Specification, Column 1, Lines 1-2, delete "Vulnerability Tracing Using Scope and Offset" insert -- Vulnerability Tracking Using Scope and Offset --

Signed and Sealed this
Twenty-second Day of April, 2025

Coke Morgan Stewart
*Acting Director of the United States Patent and Trademark Office*